April 23, 1957 — L. C. AUSTIN — 2,789,905
CAMERA FOR PRODUCING SCREEN POSITIVE
Original Filed Dec. 26, 1945
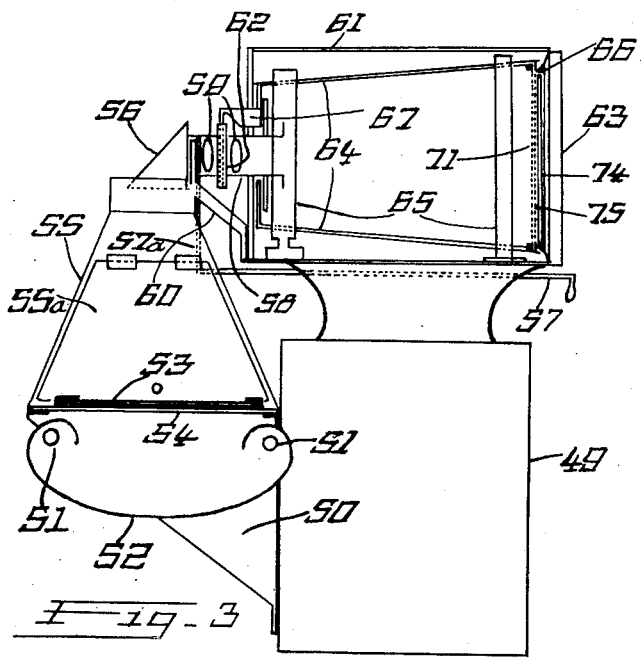
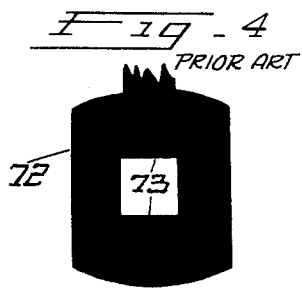
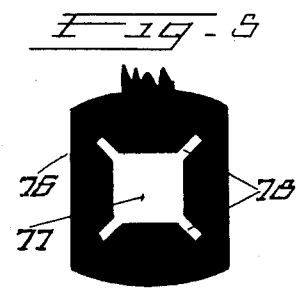
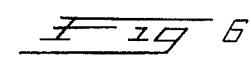
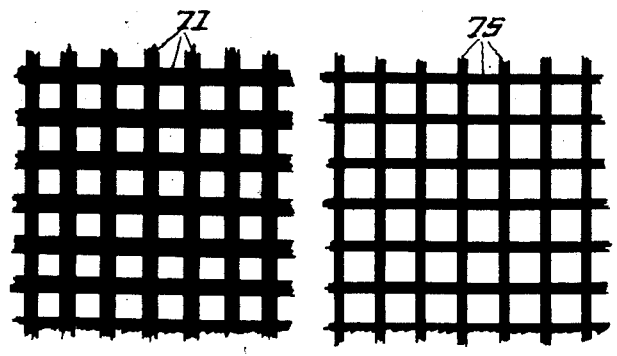
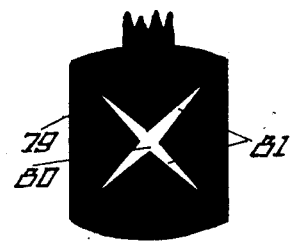
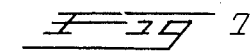
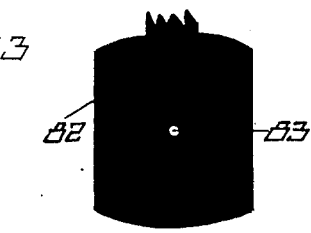
INVENTOR.
BY Lucien C. Austin
Strauch, Nolan & Neale
ATTORNEYS

United States Patent Office 2,789,905
Patented Apr. 23, 1957

2,789,905

CAMERA FOR PRODUCING SCREEN POSITIVE

Lucien C. Austin, Newton, N. J.

Original application December 26, 1945, Serial No. 637,228, now Patent No. 2,596,115, dated May 13, 1952. Divided and this application May 12, 1952, Serial No. 287,372

1 Claim. (Cl. 96—116)

The present invention relates to apparatus for producing screen positives for use in preparing intaglio printing plates and more particularly to cameras for producing screen positives of the type disclosed in Patent 2,596,115 of which the present application is a division.

Reference may be made to my aforesaid Patent 2,596,115 for a complete discussion of the advantages and use of the screen positives and the intaglio printing plates produced therewith.

It is the principal purpose and object of the present invention to provide novel apparatus for the production of improved dot-sized dot-depth screen positives in which each size of dot from the deepest shadow of the finest highlight has a separate and distinct tone value.

It is another object of the present invention to provide improved camera screen and stop arrangements which permit the production of improved high grade photogravure screen positives with a minimum use of skilled workers.

Additional objects and advantages will become apparent as the description proceeds in connection with the accompanying drawings in which:

Figures 1 and 2 are fragmentary diagrammatic sectional and plan views, respectively, of a corona tone dot photo engraved printing form produced by the screen positive made by the camera of the present invention;

Figure 3 is a diagrammatic illustration of a preferred camera stop and screen arrangement for producing the screen positive used in etching the printing form of the character illustrated in Figures 1 and 2;

Figure 4 is an illustration of a usual form of stop used in producing dot-size screen positives;

Figures 5, 6 and 7 are illustrations of preferred forms of stop utilized in the camera of the present invention;

Figures 8 and 9 are fragmental diagrammatic illustrations of screen formations used in the camera of the present invention;

Figure 10 is an illustration of the completed dot formation of the screen positive produced by the camera of the present invention; and Figures 11, 12 and 13 are illustrations of the effects of the exposures with the stops shown in Figures 5, 6 and 7, respectively.

The printing form 44 is etched from a screen positive of the subject carrying the tone values of the regular rotogravure positive and made as hereinafter more fully set forth. The image on my improved screen positive is formed of substantially square dots of varying size and as more fully hereinafter set forth each dot increases in density or resistance to the transmission of light from its periphery to a central core for motion of maximum density, and each dot from the deepest shadow dot to the smallest highlight dot diminishes in tone value as it diminishes in size. The phrase "motion of maximum density" has been coined by me to describe the novel growth of the dots and etched cavities or wells. The dots are formed by successive exposures causing them to form with varying density, and the etched cavities or wells grow from a pin point core and increase in area as they increase in depth, producing density in printing value. The screen positive is printed on a carbon or pigment resist which is transferred to the printing form, then developed and etched in usual manner. The resulting etching illustrated in Figures 1 and 2, as in the dot-size etchings decrease in area from a maximum in the shadow single tone wells 45 through the shadow two tone wells 45a, the medium tones wells 46, the highlight tone wells 47, to a minimum in the absolute highlight wells 48. In exceptional cases where absolute whites are desired in the high-light tones, absolute high-light tonal values which will produce no dots are created in the negative used as a transparency to produce the positive. In some instances this is procured by the nature of the ground of the copy, and in others it is secured by correction of the negative, all in manner well known to those skilled in the art. The cross-sectional shape of each of the wells 45 through 48 is furthermore substantially tapering V-shaped from a maximum at the surface openings of the wells to a minimum at the bottoms. This results in inclined supporting sides for the surface sections adjacent the wells providing improved resistance to the doctor blade pressures and frictional wear. The inclination of the well walls of my improved etchings is such that all of the ink is readily drawn from each well for each print under modern high speed printing conditions with normal ink variations. As a result each different size of well, no matter how minute the differences in size, deposits a differing individual amount of ink on the print. Each dot from the deepest shadow dot to the smallest absolute highlight dot therefore deposits a distinctive individual tone of dot, providing tone variations not heretofore obtainable in any prior type of photogravure etching when used for high speed printing.

In producing the screen positive the camera of the type illustrated diagrammatically in Figure 4 is used. In this figure, 49 indicates a supporting base or stand having an extension 50 which supports lights 51 together with an indirect lighting reflector 52 above which a negative 53 of the subject to be printed is supported on a supporting plate 54 preferably a diffusing plate. A metal light shield 55 provided with a door 55a for insertion of the negative is interposed between plate 54 and optical prism 56 which is mounted above and in the path of the light projected through the negative. Prism 56, is provided with an exposure shutter 57 operated by rod 57a from the back of the camera in well known manner, and is supported on the end of lens barrel 58. Supported in lens barrel 58 is lens 59. The outer end of the lens barrel and the upper part of light shield 55 are supported by a member 60 from the camera body 61. Mounted in barrel 58 is a rotatable stop frame 62, and the barrel is secured at its inner end to and extends slightly into a camera body 61, which at its rear carries a plate or film holding camera back 63.

Mounted rotatably in body 61 is a truncated conical tube 64 the forward wall of which is journalled on the inner end of lens barrel 58. Adjacent its ends tube 64 is rotatably supported in cradles 65. Mounted on the rear end of tube 64 is a screen supporting frame 66. Tube 64 is connected by an extension 67 passing through a suitable slot in the front wall of body 61 to the stop carrying frame 62. By this construction the screen assembly and stop are held in predetermined longitudinal relationship with respect to each other, the lens assembly and the sensitized surface, and may be simultaneously angularly adjusted as desired.

A half tone type objective screen 71 (Figure 8), which may be a cut glass 150 line 60 to 40 ratio of openings to ruling, is mounted in frame 66 at such a distance from the sensitized surface of a plate or film positioned in camera back 63 that with the usual half tone type of stop 72 (Figure 4) having the usual square opening 73 for the passage of light mounted in stop frame 62 a checkerboard screen pattern of separated dots is projected on the sensitive surface. These dots decrease in size from a maximum in the deepest shadow tones to a minimum or no dots at all in the absolute high light areas. However, by use of a series of different stops, such as for example of the shapes illustrated in Figures 6, 7 and 8 inserted in stop frame 62 in successive exposures, I modify the checkerboard screen formation into a full scale screen formation of the type illustrated in Figure 2, as more fully hereinafter described.

For best results I prefer to use a normal or continuous tone rather soft emulsion plate or film, which cannot be used for the usual half tone screen work, because they will not provide a sharp dot formation of the half tone process plates, due to their softness. Such normal or soft emulsion plates are used in my improved process because very little light will cause reaction on the plate and create an image. On the other hand, the prior dot-size processes require a very contrasty plate which emphasizes the dot image with respect to the clear plate areas, and require a full complement of light during exposure.

I preferably interpose between objective screen 71 and the sensitized plate or film 74 mounted in back 63, preferably held in place by suction, a gravure type secondary screen 75 (Figures 3 and 9) disposed directly against the sensitized surface, with its screen lines transparent or light transmitting square openings respectively in register or optical alignment with the lines and openings of the primary or objective screen 71 so that a single screen image is projected on the sensitized surface. By way of example, with a 150 line 60 to 40 ratio objective or primary screen 71 as above described I have used a 150 line 80 to 20 ratio of openings to rulings in the secondary screen 75. As will be understood by those skilled in the art the relative screen rulings and spacings may be varied widely depending upon the lenses and camera extension used and the screen positive effects desired. The secondary screen 75, when used, prevents dispersed or deflected light from striking screen line areas projected on the sensitized surface. This deflected or dispersed light results in a light fog in the line areas on a screen positive made with primary screen 71 only, unless unusual skill is exercised in printing the screen positive on the carbon resist.

To assure proper optical relationship or register of the objective or primary and secondary screens 71 and 75, the two screens are preferably permanently fastened together after the rulings, spacing, and proper optical relationship have been established for a given camera. This may be accomplished for example by ruling the primary and secondary screens in register on opposite sides of a glass plate of proper thickness, or by utilizing separate screens that are brought into register and properly spaced in a holding frame and then locked permanently in place, or by setting the screens in register and properly spaced in a suitable transparent plastic.

In addition to the usual types of half tone ruled glass screens, I contemplate the use of metallic screens which may be formed with proper opening and line ratios for example by electro-deposition of nickel on master plates of the character described in United States Patent No. 2,024,086 having the desired screen patterns. Such metallic screens have the advantage that they reduce light diffraction to a minimum.

A full tone negative of the subject placed on plate 54 (Figure 3) will be properly focused on the sensitized plate or film 74, and the screen or screens in place in frame 63, the first short exposure is made with the stop 76 of Figure 5 in frame 62. Stop 76 is provided with a substantially square central opening 77 and is positioned in frame 62 so that the sides of opening 77 are parallel to the sides of the screen squares. Extending diagonally from the corners of opening 77 are rectangular openings 78 which preferably extend to the full capacity of the lens assembly, and are proportioned and arranged with respect to the screen openings so that the light transmitted therethrough increases the light passing through the corner areas of the screen squares to the sensitized surface. With a soft tone commercial plate, by way of example, with a girl's head and tone wedge as the subject, I have made this exposure about six seconds. The dot formation as a result of such an exposure above, when developed, has the general appearance of the formation illustrated in enlarged form in Figure 11, having a square full scale screen outlined with the density of exposure increasing from the periphery to the center of the dot.

After the first exposure stop 76 is replaced with a second stop 79 and given a second short exposure. This stop preferably is provided with a four pointed opening 80, provided with four pointed arms 81 which extend diagonally a distance from the center of the opening equal to the distance of the outer edges of extensions 78 from the center of the opening 77 of stop 76. The maximum diagonal dimension of the openings in these two stops are made equal, and the points of openings 81 are positioned in frame 62 so they will coincide with the position assumed by the centers of extensions 78 of stop 76 during the first exposure. This places the diagonal axes of points 81 across the corners of the screen squares, and the stop size is such that there will be no need to make any change in screen distance for the second exposure.

The second exposure is then made adding its effects to the first exposure. In the second exposure, which in the specific example given in connection with the first exposure, was 15 seconds, the central area and corner exposures of the dot formations of the first exposure are increased. The second exposure pattern, when made alone with stop 79 of Figure 6 and developed is generally of the form illustrated in enlarged form in Figure 13.

After the second exposure has been completed a third exposure is preferably made to increase the extent of exposure of the central core areas of the dots preferably with stop 82 such as illustrated in Figure 7, which is provided with a small central pin-hole opening 83. In this exposure, which in the specific example given in connection with stops 76 and 79 was about 90 seconds, the central core exposure of the previously formed dot exposures is intensified further. The third exposure pattern when made with stop 82 alone and developed, is of the general form illustrated in enlarged form in Figure 12.

After the foregoing exposures are completed the plate or film is developed, and the resulting screen positive of the subject will be made up of dots of varying sizes, densities and tonal values depending upon the tonal values of the subject as illustrated in enlarged form in Figures 1 and 2. The tonal values extend over the tonal range of regular rotogravure positive, and each dot has the general pattern illustrated in enlarged form in Figure 10.

Because of its nature, no corrections can be made in my improved screen positive. All corrections must be made in the negatives. However, by the provision of my improved camera in which the proper lens, stop, screen and plate or film relationships and optical registry are all built into each camera for the production of a particular size and type of negative, without any provision for adjustment of any kind except the angular relation of dot position to the negative image, standardized procedures and formulae including the types of plates or films to be used, light intensities, and exposure times may be adopted minimizing the skill required in producing standardized screen positives from correct negatives which require no retouching. And such standardized screen positives for the first time permit the use of predetermined etching acid formulae and procedures which result in uniformly high grade etching high grade prints with minimum skill in production.

In etching with my improved screen positive the image is printed on the sensitized resist by a single exposure and the resist is then transferred to the plate or cylinder and the usual rotogravure etching procedure is followed. The etching period using my improved screen positive is about from twenty-three to twenty-five minutes giving control of the etching approximately equal to that secured in the regular rotogravure etching. The resulting etching consists of varying size and tone wells having V-shaped cross-sections 45, 46, 47 and 48 such for example as are illustrated in Figure 1.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A camera for producing screen positives of the same size as a given negative comprising, a camera body of fixed dimensions, a lens barrel projecting into said body and secured thereto, a lens assembly in said barrel, a stop frame rotatably mounted in said lens barrel, said stop frame having means for selectively supporting and positioning a plurality of stops of different shape within said lens assembly in predetermined relation thereto, a tubular member of fixed dimensions rotatably mounted within said body and fixed against axial movement therein, a screen assembly comprising primary and secondary metallic screens, said primary screen being a half-tone screen and said secondary screen being a gravure screen, a rigid frame mounting said screens in spaced relation with their opaque lines and light transmitting openings in fixed optical register, means for supporting said frame in predetermined fixed position in said tubular member, means fixing said tubular member carrying said screen assembly against relative angular movement with respect to said stop frame while permitting their unitary angular adjustment, means for supporting a sensitized emulsion surface in contact with said secondary screen whereby an image projected from said negative through said lens assembly will be projected through said stop frame and said screen assembly onto said emulsion surface in said camera, the distance of said primary screen from said stop support and said emulsion surface being such that said image on said emulsion surface projected through said screen assembly is formed by distinct dots separated by unexposed areas covered by the opaque lines of said secondary screen.

References Cited in the file of this patent

UNITED STATES PATENTS

| | | |
|---|---|---|
| 1,187,045 | Bouzer | June 13, 1916 |
| 1,513,379 | Douthitt | Oct. 28, 1924 |
| 1,562,757 | Hammond | Nov. 24, 1925 |
| 1,732,051 | Johnson | Oct. 15, 1929 |
| 2,032,541 | Losier | Mar. 3, 1936 |
| 2,039,195 | Stirling | Apr. 28, 1936 |
| 2,171,276 | Norris | Aug. 29, 1939 |
| 2,226,086 | Wilkinson | Dec. 24, 1940 |
| 2,387,048 | Alger | Oct. 16, 1945 |
| 2,482,638 | Schultz | Sept. 20, 1949 |

FOREIGN PATENTS

| | | |
|---|---|---|
| 716,362 | Germany | Jan. 31, 1942 |
| 729,411 | Germany | Dec. 23, 1942 |
| 711,572 | Germany | Feb. 11, 1943 |